United States Patent [19]

Cullen et al.

[11] Patent Number: 5,893,908
[45] Date of Patent: Apr. 13, 1999

[54] DOCUMENT MANAGEMENT SYSTEM

[75] Inventors: John Cullen, Redwood City; Mark Peairs, Menlo Park, both of Calif.

[73] Assignees: Ricoh Company Limited, Tokyo, Japan; Ricoh Corporation, Menlo Park, Calif.

[21] Appl. No.: 08/754,725

[22] Filed: Nov. 21, 1996

[51] Int. Cl.⁶ .................................................. G06F 17/30
[52] U.S. Cl. ..................... 707/5; 707/2; 707/500; 345/348
[58] Field of Search ..................... 707/1, 2, 3, 4, 707/5, 6, 7, 8, 9, 10, 100, 200; 711/100; 345/351, 357, 428, 439; 358/402, 453, 462; 380/25; 399/366

[56] References Cited

U.S. PATENT DOCUMENTS

| | | | |
|---|---|---|---|
| 5,060,135 | 10/1991 | Levine et al. | 345/351 |
| 5,138,465 | 8/1992 | Ng et al. | 358/453 |
| 5,204,947 | 4/1993 | Bernstein et al. | 345/357 |
| 5,465,353 | 11/1995 | Hull et al. | 395/600 |
| 5,530,520 | 6/1996 | Clearwater | 399/366 |
| 5,611,066 | 3/1997 | Keele et al. | 711/100 |
| 5,671,282 | 9/1997 | Wolff et al. | 380/25 |

*Primary Examiner*—Thomas G. Black
*Assistant Examiner*—Ruay Lian Ho
*Attorney, Agent, or Firm*—Townsend and Townsend and Crew LLP

[57] ABSTRACT

An electronic document management system that takes advantage of advanced document analysis techniques. The electronic document management system may provide automatic archiving of documents and retrieval without the need to navigate through a directory structure or specify a filename. Document comparison is facilitated by automatic retrieval of a previous version of a document. A digital copier alerts a user when a document to be copies already exists electronically within a database.

20 Claims, 9 Drawing Sheets

DOCUMENT MANAGEMENT SYSTEM

STATEMENT OF RELATED APPLICATIONS

The present application relates to the subject matter of another application entitled "AUTOMATIC AND TRANSPARENT DOCUMENT ARCHIVING" Ser. No. 08/754,721, co-assigned with the present application and filed on the same day. The contents of the "AUTOMATIC AND TRANSPARENT DOCUMENT ARCHIVING" application are herein incorporated by reference for all purposes.

BACKGROUND OF THE INVENTION

The present invention relates to an electronic document management system for and more particularly to such a system that exploits advanced document analysis techniques.

Electronic creation, editing, and storage of documents has become commonplace. However, paper documents remain important and the processes of printing, faxing, and copying are still central to document distribution and management. The reasons for the continued centrality of paper are varied. Paper documents are easy to review and annotate, portable, and in fact represent a "universal standard" for display, a goal yet tantalizingly out of reach in the electronic world.

Current document management techniques do not acknowledge the continued use of paper or the reasons for it. For example, consider existing systems for storage and retrieval of electronic documents. Typically, a document is specified for retrieval by navigation through a hierarchical directory structure and reference to a file name. However, if the hierarchical directory structure and accompanying file names are not created with great care, retrieving a desired document becomes very difficult because it will be nearly impossible to identify. Studies of electronic filing have found that users usually fail to put in the effort to establish proper electronic filing schemes, often because the effort required is not justified by the value of the information.

By contrast, paper documents are inherently recognizable by appearance. A quick glance is all that is required. Proper filing of paper documents for later retrieval requires a certain administrative discipline but the retrieval process itself is facilitated because paper files themselves are recognizable by titles on their face and by the appearance of their contents.

Present electronic document comparison procedures, i.e., procedures designed to highlight the differences between two versions of a document, are ill-suited for the hybrid world of electronic and paper documents. They assume that both versions of a document to be compared are available electronically and may be readily identified, conditions that are often not satisfied. For example, geographically dispersed authors using two different word processors may communicate with paper hardcopy drafts. Furthermore, it may be difficult to identify and retrieve a previous electronic version of a document for the reasons given above.

What is needed is an electronic document management system that recognizes the continued use of paper documents while facilitating electronic document filing and document comparison.

SUMMARY OF THE INVENTION

The present invention provides an electronic document management system that takes advantage of advanced document analysis techniques. An electronic document management system may provide automatic archiving of documents and retrieval without the need to navigate through a directory structure or specify a filename. Document comparison is facilitated by automatic retrieval of a previous version of a document. Another aspect of the present invention provides that a digital copier alerts a user when a document to be copied already exists electronically within a database.

One basis for the document management advances of the present invention is a family of document analysis techniques that involve the development of special descriptors that characterize a document. A document database stores descriptors for stored documents to facilitate later retrieval. The retrieval process may include development of descriptors for a search key document. The best match to the search key document is determined by comparing its descriptors to the descriptors in the database.

Descriptor technology and related search techniques have been developed by researchers at Ricoh California Research Center, an assignee of the present application and are described in the following U.S. patent applications, all of which are expressly incorporated herein by reference for all purposes:

IMAGE MATCHING AND RETRIEVAL BY MULTI-ACCESS REDUNDANT HASHING, U.S. application Ser. No. 08/222,281, filed Apr. 1, 1994 now U.S. Pat. No. 5,465,353.

HIGH SPEED RETRIEVAL BY EXAMPLE, U.S. application Ser. No. 08/523,731, filed Sep. 5, 1995.

ICONIC PAPER, U.S. application Ser. No. 08/431,059, filed Apr. 28, 1995.

One aspect of the present invention provides a hypertext interface system for navigating through a sequence or tree of document versions. To support this interface, an automatic archiving system may automatically associate new versions of documents with previous versions.

Another aspect of the invention provides automatically developed queries. For example, a user may present a page or icon as a search key to find an electronic intermediate version of a document. The automatic search includes development of descriptors of the search key and comparison to descriptors of the automatically archived documents to find a best match. The hypertext interface system identifies the best match to the user. The user may then navigate using the hypertext interface to find a final version of the document.

A further understanding of the nature and advantages of the inventions herein may be realized by reference to the remaining portions of the specification and the attached drawings.

DESCRIPTION OF SPECIFIC EMBODIMENTS

System For Automatic Storage of Electronic Documents

Figure 1:
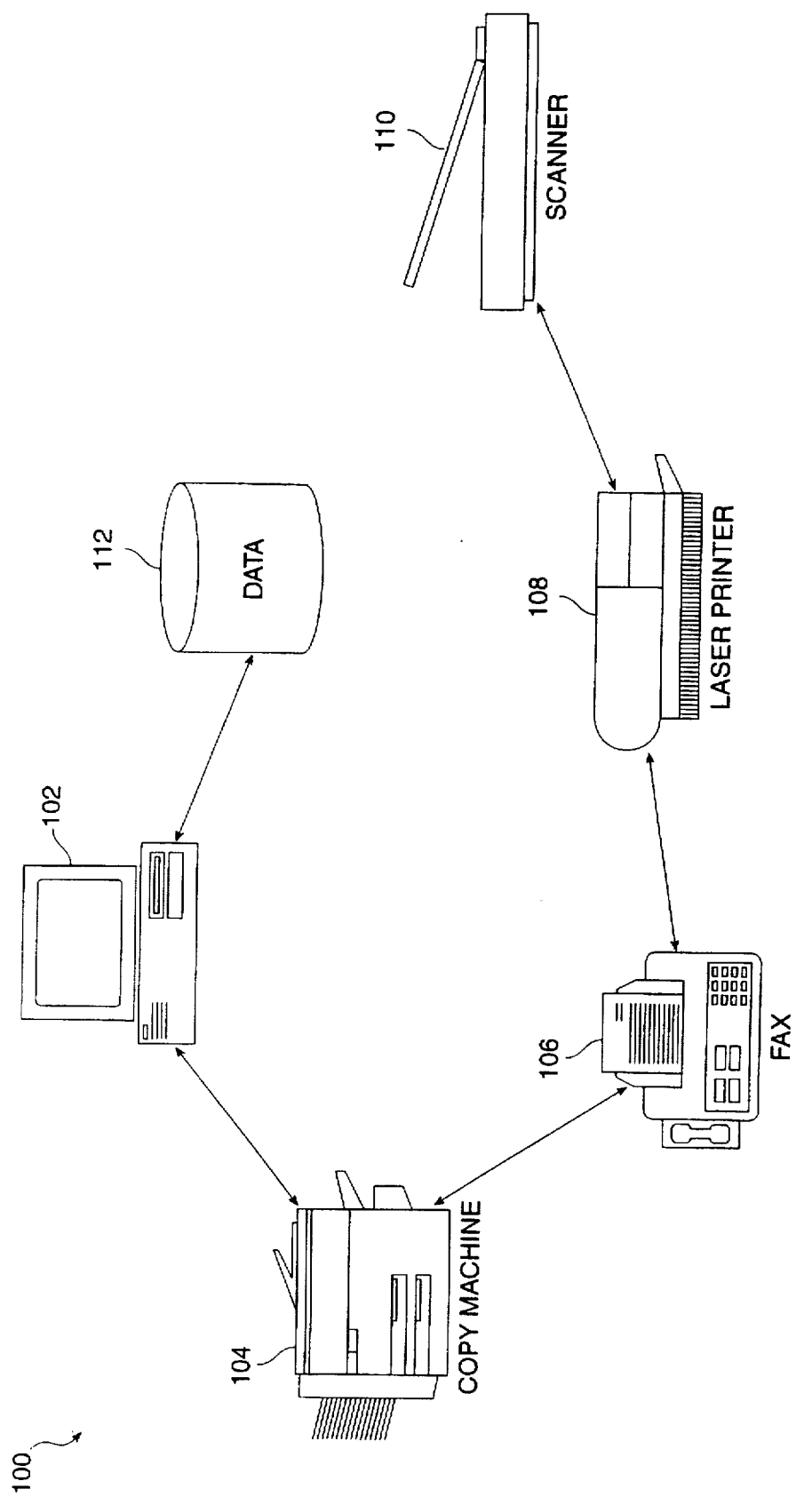
FIG. 1 depicts an office equipment network in accordance with one embodiment of the present invention.

FIG. 1 depicts an office equipment network 100 in accordance with one embodiment of the present invention. Office equipment network 100 interconnects a computer system 102, a digital copy machine 104, a facsimile machine 106, and a laser printer 108, and a scanner 110. Computer system 102 also is connected to access a mass storage device 112.

Computer system 102 may collect information from any of copy machine 104, fax machine 106, laser printer 108, scanner 110. During the course of their normal operation, each of these devices captures image information representing documents. For example, for every document to be copied, copy machine 104 captures digital information representing the document. The user may request that computer system 102 archive the captured image information on mass storage device 112. An automatic archiving system is described in the application entitled "AUTOMATIC AND TRANSPARENT ARCHIVING OF DOCUMENTS" commonly assigned with the present application and filed on the same day.

Figure 2:
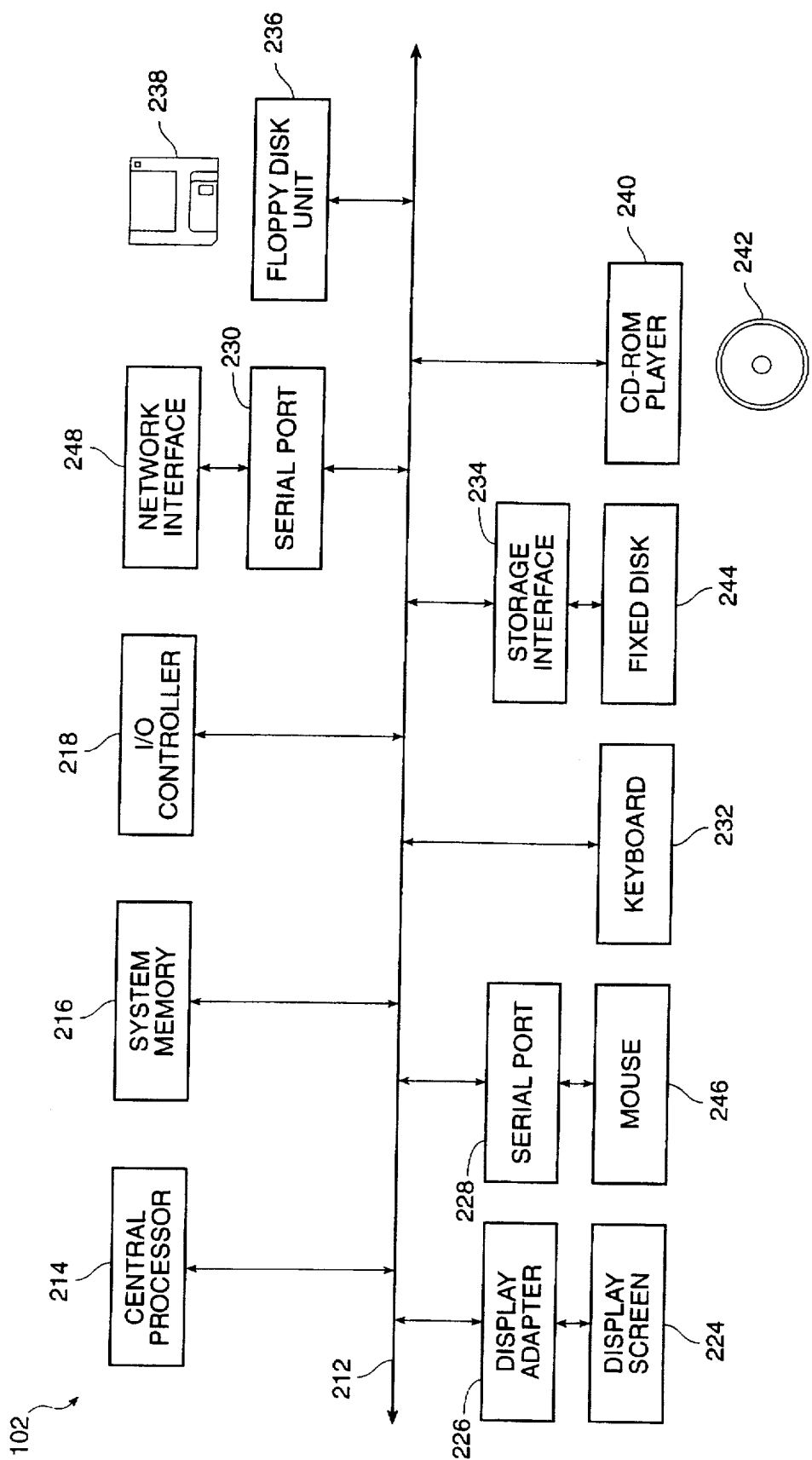
FIG. 2 depicts a representative computer system suitable for implementing the present invention.

FIG. 2 depicts a block diagram of computer system 102 suitable for implementing the present invention. Computer system 102 as shown in FIG. 2 is useful as either a building block of office network 100 or to implement other features of the present invention. Computer system 102 includes a bus 212 which interconnects major subsystems such as a central processor 214, a system memory 216 (typically RAM), an input/output (I/O) controller 218, an external device such as a display screen 224 via display adapter 226, serial ports 228 and 230, a keyboard 232, a storage interface 234, a floppy disk drive 236 operative to receive a floppy disk 238, and a CD-ROM player 240 operative to receive a CD-ROM 242. Storage interface 234 may connect to a fixed disk drive 244 or to a mass storage device such as mass storage device 112 shown in FIG. 1. Fixed disk drive 244 may be a part of computer system 102 or may be separate and accessed through other interface systems. Many other devices can be connected such as a mouse 246 connected via serial port 228 and a network interface 248 connected via serial port 230. Network interface 248 may provide a direct connection to a remote server via a telephone link or to the Internet via a POP (point of presence). Many other devices or subsystems (not shown) may be connected in a similar manner.

Also, it is not necessary for all of the devices shown in FIG. 2 to be present to practice the present invention, as discussed below. The devices and subsystems may be interconnected in different ways from that shown in FIG. 2. The operation of a computer system such as that shown in FIG. 2 is readily known in the art and is not discussed in detail in this application. Code to implement the present invention may be operably disposed or stored in computer-readable storage media such as system memory 216, fixed disk 244, CD-ROM 242, or floppy disk 238.

Automatically Created Archive Structure

Figure 3:
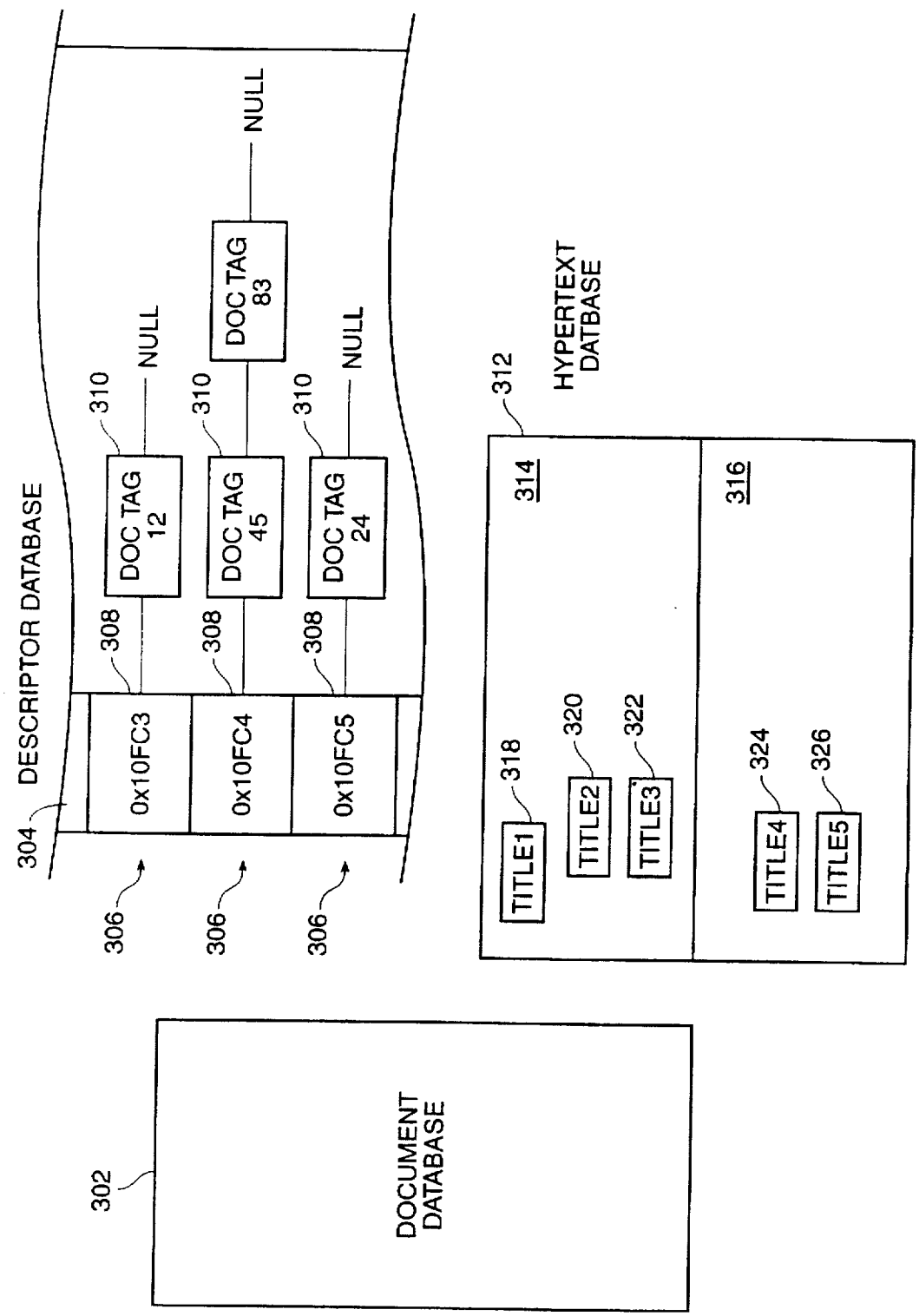
FIG. 3 is a diagram depicting data structures used in operating a document database in accordance with one embodiment of the present invention.

FIG. 3 is a diagram depicting data structures used in operating an archiving system in accordance with one embodiment of the present invention. An archiving system according to this aspect of the present invention may be understood as incorporating three distinct data structures to aid querying and retrieval. A document database 302 stores information representing archived documents. This information may include, for example, bit maps of document images, text data derived from OCR results, Postscript files, word processing files, etc.

A descriptor database 304 lists a plurality of descriptors identifying features of a document. For each descriptor, the documents in document database 302 having the identified feature are listed. This descriptor information greatly facilitates queries. Preferably, descriptor database 304 is implemented as a series of linked lists 306 for each descriptor. The first entry in the linked list includes a pointer 308 to a tag 310 identifying a document having the feature identified by the descriptor. This tag either points to another such document tag 310 or points to NULL indicating the end of the linked list. To economize on storage space, the first pointer 308 for each descriptor is stored in sequence in memory. Memory position is sufficient to identify the first pointer for each descriptor. In some implementations, querying the database is further facilitated by storing with each tag information representing a particular position in the document where a feature identified by a descriptor may be found.

A hypertext database 312 shows the version relationship among documents stored in document database 302. Preferably, hypertext database 306 includes an HTML page for each series of document versions. FIG. 3 shows simplified representations of two exemplary pages 314 and 316. Each HTML page includes the titles of documents in document database 302 in the form of HTML link anchors which include a filename in document database 302. The indentation of the titles on the page shows the relationships among the versions. Optionally, the HTML page also includes information identifying a date the document was archived and information identifying which office equipment item was the document's entry point into the system.

Page 314 shows a "Title1" 318 identifying a parent version of a document. A "Title2" 320 and a "Title3" 322 identify children versions of the parent that are siblings to one another. The indentations of "Title2" and "Title3" relative to "Title1" demonstrate that "Title3" is not considered to be a later version of "Title2" but appears to have been independently derived from "Title1." Page 316 shows a "Title4" 324 and a "Title5" 326 at the same indentation indicating that "Title5" identifies a unique later version of the document identified by "Title4."

Figure 4:
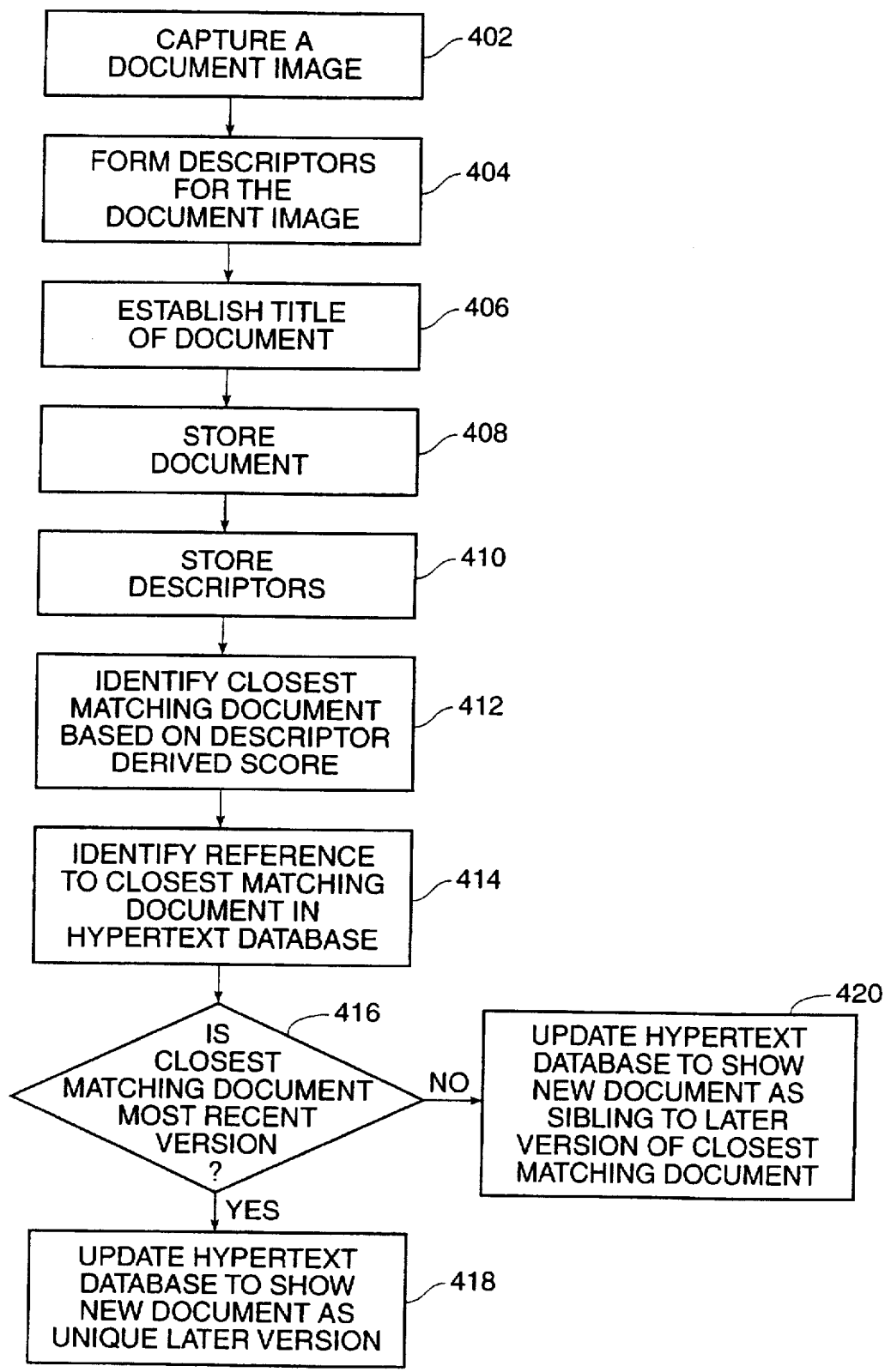
FIG. 4 is a flowchart describing steps of archiving an electronic document in accordance with one embodiment of the present invention.

FIG. 4 is a flowchart describing steps of archiving a document in accordance with one embodiment of the present invention. At step 402, the document management system operating at computer system 102 captures an image of the document to be archived. This step may follow from the operation of copy machine 104, facsimile machine 106, laser printer 108, or scanner 112, etc. At step 404, descriptors of the document are formed. The formation of descriptors may or may not involve intermediate OCR processing.

At step 406, the document management system preferably establishes a title for the new document. This may be done in a variety of ways. For example, the document management system may extract a title from a title page. If the document was captured at a laser printer, a title of the print job will be sent from the laser printer to computer system 102. At step 408, the document management system stores the document in document database 302. At step 410, the document management system stores tags pointing to the document's position or filename in descriptor database 304 for each descriptor formed in step 404.

The next step 412 in archiving is to use the descriptors to find the closest matching document already in document database 302. This is presumed to be a previous version of the new document to be archived. The matching process includes a scoring operation to find the documents having the most descriptors in common with the new document. In some implementations, it may be beneficial to accord different descriptors different weights for this scoring operation.

At step 414, the document management system searches hypertext database 312 for a link to the closest matching document. The context of this link in hypertext database 312 shows the currently known relationship among versions of the closest matching document. At step 416, the document management system determines if the closest matching document represents the most recent version by reference to hypertext database 312. If the closest matching document is the most recent version, the hypertext database is updated to show that the newly archived document is the only later version of the closest matching document at step 418, i.e., the title of the newly archived document appears directly underneath the title of the closest matching document on the HTML page. If the closest matching document is not the most recent version, the hypertext database is updated at step 420 to show that the newly archived document is a sibling of the version following the closest matching document. The title of this following version and the title of the newly archived document appear indented from the title of the closest matching document. In either case, the title of the new document is stored in the hypertext database along with the time and date of archiving, and information identifying which piece of office equipment represented the source of the document.

In an alternative embodiment, an additional step may be added. If a newly captured document image is dissimilar to all previously stored documents, it is identified as a new "root" document within hypertext database 312.

Document Database Queries

The availability of descriptor information for each document stored in database 302 facilitates later queries. The user may search for a desired document by scanning in one or more pages of the document or by scanning or otherwise specifying a miniature icon representing the document image. The generation and application of such icons are described in the ICONIC PAPER patent application.

Figure 5:
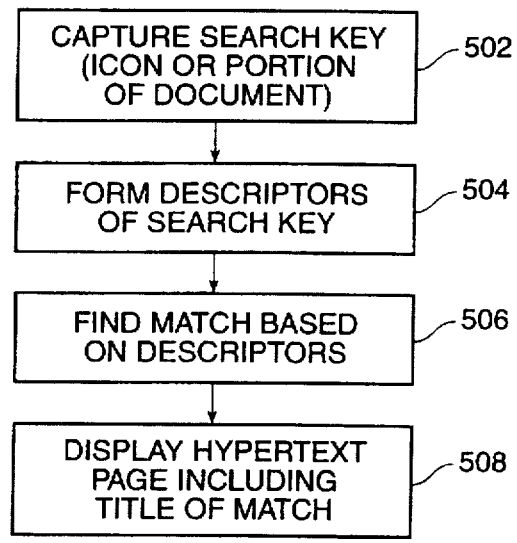
FIG. 5 is a flowchart describing steps of querying a document database in accordance with one embodiment of the present invention.

FIG. 5 is a flowchart describing steps of querying a document database in accordance with one embodiment of the present invention. The searching process begins at step 502 with scanning in specifying the search key. At step 504, descriptors are formed for the search key. At step 506, the document management system searches for a best match using the descriptors stored in descriptor database 304. The best match is determined to be the document having the most descriptors in common with the ones obtained from the search key. In some implementations, different descriptors will be accorded different weights in determining the best match. At step 508, the document management system retrieves the hypertext page including a link to the best match and displays it as shown in FIGS. 6A–6B to facilitate retrieval of the best match or further navigation through the document database.

Figure 6A:
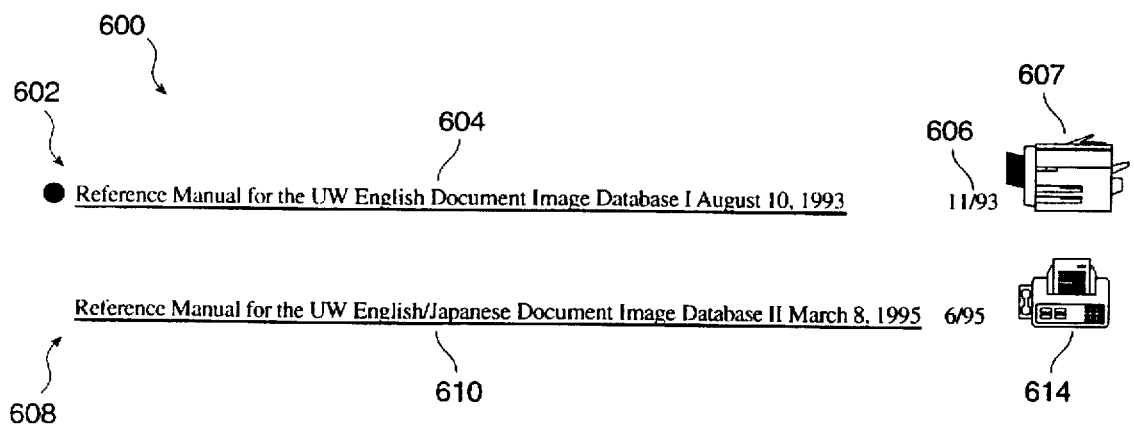
FIG. 6A depicts a display screen of a hypertext document browsing interface in accordance with one embodiment of the present invention wherein a linear version structure is displayed.

FIG. 6A depicts a display screen 600 of a hypertext document browsing interface wherein a linear version structure is displayed in accordance with one embodiment of the present invention. A first displayed entry 602 includes a title 604, an archiving date 606, and a source icon 607. Title 604 is a link which a user can select to retrieve the identified document. Source icon 606 signifies that the document specified by title 604 was archived as a result of being entered in a digital copier. A second displayed entry 608 includes a title 610, an archiving date 612 and a source icon 614. Title 610 appears with the same indentation as title 604 to indicate that the document specified by title 610 is considered to be a unique derivative of the document specified by title 604. Source icon 614 specifies that the identified document was archived when it was faxed.

Figure 6B:
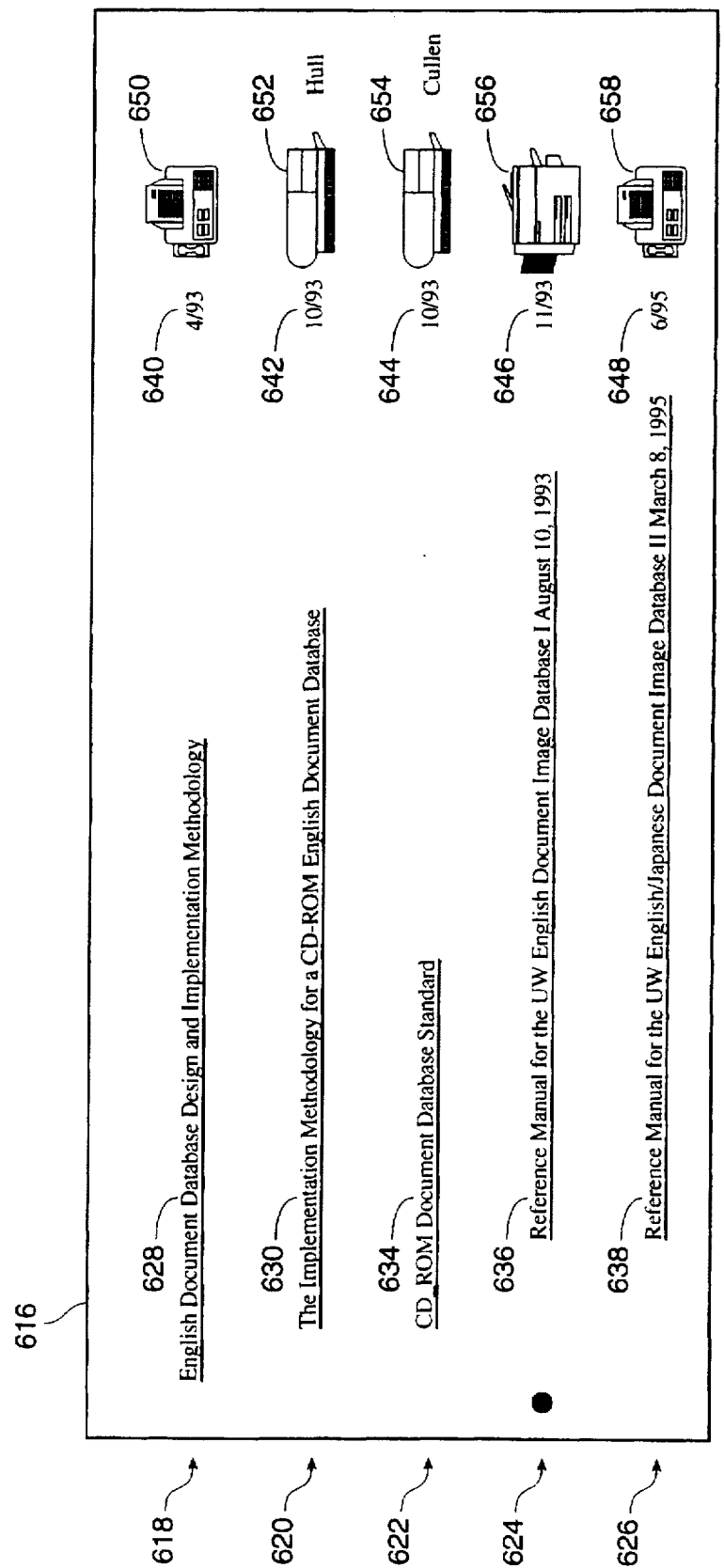
FIG. 6B depicts a display screen of a hypertext document browsing interface in accordance with one embodiment of the present invention wherein a tree structure is displayed.

FIG. 6B depicts a display screen 616 of a hypertext document browsing interface wherein a tree structure is displayed in accordance with one embodiment of the present invention. Display screen 616 includes entries 618, 620, 622, 624, and 626 including corresponding titles 628, 630, 634, 636, and 638; corresponding archiving dates 640, 642, 644, 646, and 648; and source icons 650, 652, 654, 656, and 658. Titles 630 and 632 identify documents that appear to be derived from the document identified by title 628. Titles 634 and 636 identify documents that appear to be derived from the document identified by title 632. Source icons 650 and 658 specify that the identified documents were archived when faxed. Source icons 652 and 654 specify that the identified documents were archived when printed. Source icons 656 specifies that the identified document was archived when copied. Name icons 660 and 662 denote the owner of the document.

Digital Copier Alert

Figure 7:
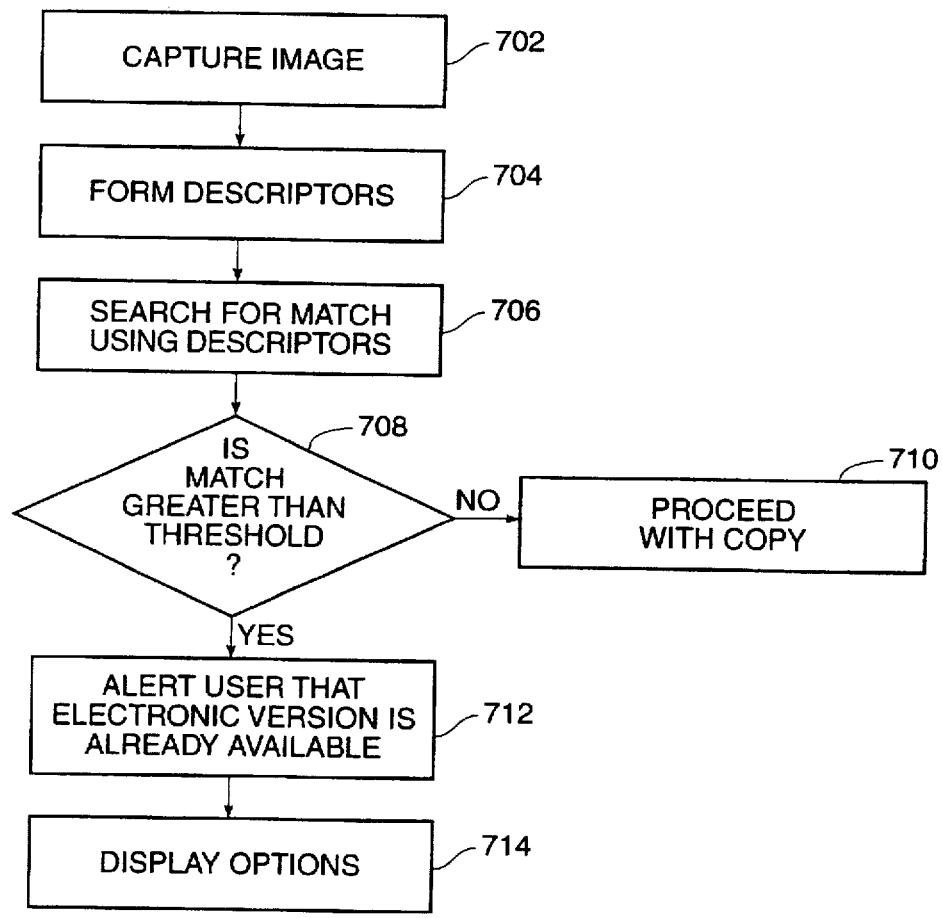
FIG. 7 is a flowchart describing steps of operating a digital copier to alert a user that a document is already available electronically in accordance with one embodiment of the present invention.

FIG. 7 is a flowchart describing steps of operating digital copier 104 to alert a user that a document is already available electronically in accordance with one embodiment of the present invention. At step 702, an image of a first page to fed into copier 104 is captured. At step 704, the document management system forms descriptors of this image. At step 706, the document management system searches descriptor database 304 to find documents having descriptors in common with the captured image. The degree of match, i.e., the number of descriptors in common or a weighted total, is compared to a threshold at step 708. If the degree of match is less than the threshold, copying proceeds as usual at step 710. If the degree of match is greater than the threshold, digital copier 104 provides an alert indication to the user that the document to be copied is available in electronic form. At step 712, digital copier 104 displays options to the user.

Figure 8:
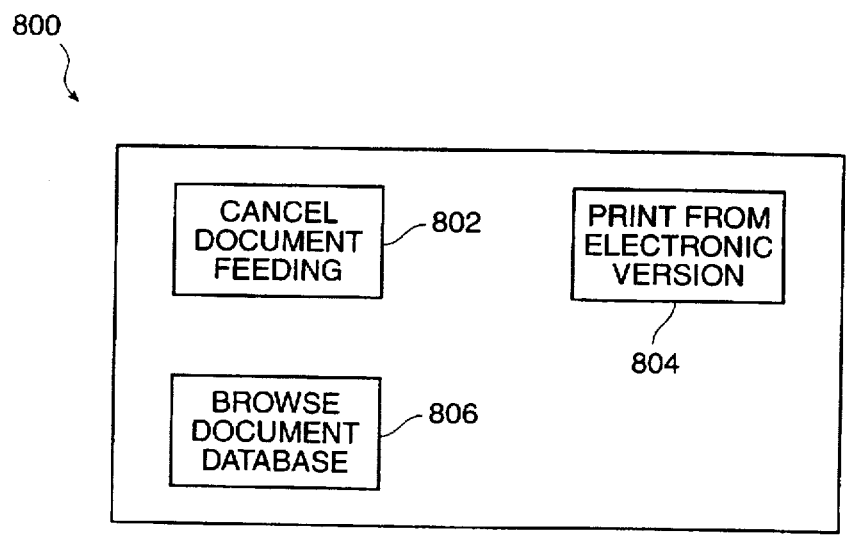
FIG. 8 depicts a display screen generated by a digital copier to alert a user that a document is already available electronically in accordance with one embodiment of the present invention.

FIG. 8 depicts a display 800 generated by digital copier 104 to display options to the user if an electronic version of a document to be copied is available. Display 800 is preferably a touch-sensitive screen. A soft key 802 offers the option of halting document feeding. A soft key 804 allows the user to print the electronic version of the document. A soft key 806 offers the user the option of browsing through the document database using the hypertext interface described above. The hardware and software to implement the functionality of FIGS. 7–8 may be incorporated, e.g., entirely within digital copier 104 or distributed among digital copier 104, computer system 102, and mass storage device 112.

Document Comparison

Figure 9:
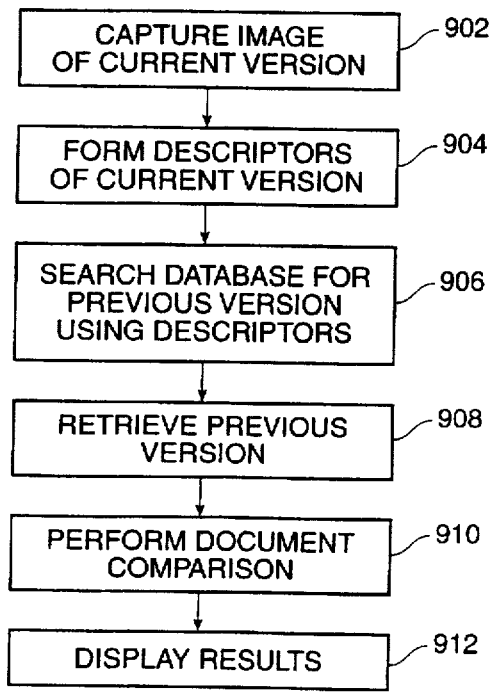
FIG. 9 depicts steps of comparing versions of a document in accordance with one embodiment of the present invention.

The document management system of the present invention may also provide features for enhancing comparison of electronic documents. Document comparison features may be implemented as a part of the operation of network 100. For example, a user may compare a current version of a document with a previous version without knowing how to locate the previous version. FIG. 9 depicts steps of comparing versions of a document in accordance with one embodiment of the present invention. At step 902, the document management system captures an image of the current version of the document using scanner 110, for example. At step 904, the document management system forms descriptors of the current version. At step 906, the current version descriptors are used as a basis for searching the document database 302. The best match identified at step 906 is retrieved at step 908 as the previous version of the document. Alternatively, the document management system could present a hypertext display to assist the user in completing the search and finding the previous version.

At step 910, the document management system performs the document comparison between the current and previous versions. This step typically incorporates OCR processing followed by a standard text differencing algorithm. At step 912, the results of the comparison are displayed with deletions and insertions highlighted.

Figure 10:
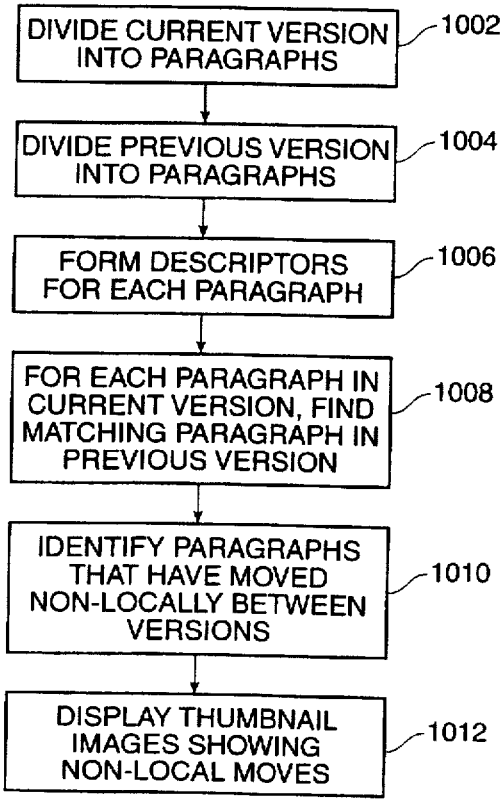
FIG. 10 depicts steps of detecting non-local changes within a document in accordance with one embodiment of the present invention.

Another document comparison capability provided by the present invention is determining and displaying non-local changes. Prior art document comparison systems cannot identify and display editing changes that move text long distances in the document. FIG. 10 depicts steps of detecting non-local changes within a document in accordance with one embodiment of the present invention. Assuming that both the current version and previous version are electronically available, the comparison process begins at step 1002 where the current version is divided into segments, preferably paragraphs. At step 1004, the previous version is also divided into paragraphs. At step 1006, descriptors are formed separately for each paragraph of each version. At step 1008, based on descriptor matching, each paragraph in the current version is mapped to a closest matching paragraph in the previous version. In this way, paragraphs that have moved great distances are identified. At step 1010, thumbnail images of both versions are displayed with the non-local changes highlighted.

Figure 11:
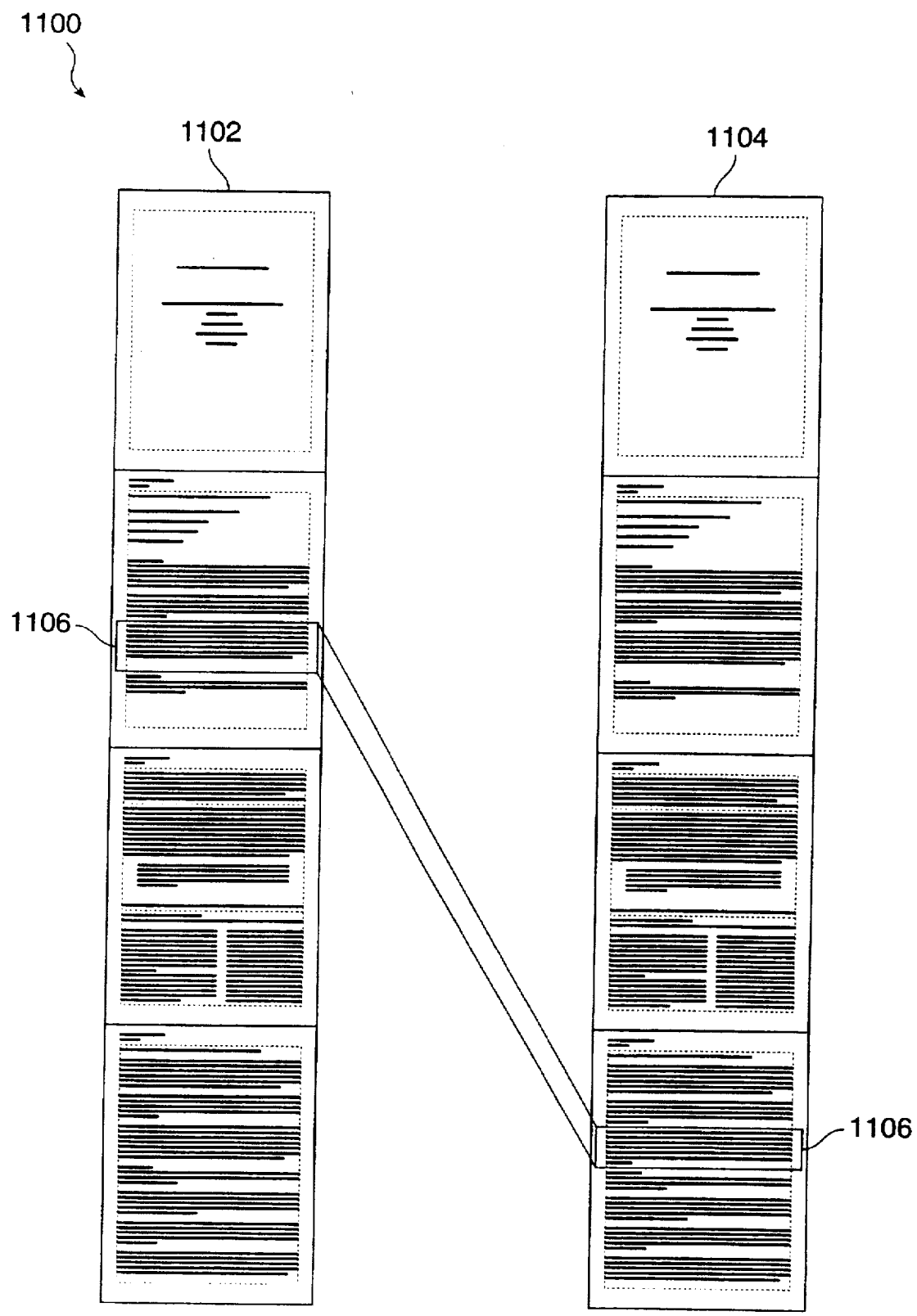
FIG. 11 depicts a display highlighting non-local changes within a document in accordance with one embodiment of the present invention.

FIG. 11 depicts a display 1100 highlighting non-local changes within a document in accordance with one embodiment of the present invention. A first thumbnail image 1102 shows the previous version of the document. A second thumbnail image 1104 shows the previous version of the document. A paragraph 1106 is highlighted in both images and shown as having shifted position between versions.

Descriptor Formation

Many of the document management system features described in the present application involve the formation of document descriptors which identify features of a document. The present invention is not limited to any particular technique for descriptor formation. Examples of descriptor formation techniques are described in the patent applications incorporated by reference above, IMAGE MATCHING AND RETRIEVAL BY MULTI-ACCESS REDUNDANT HASHING, and HIGH SPEED RETRIEVAL BY EXAMPLE. Descriptors disclosed therein include sequences of consecutive word lengths and invariant relationships between graphic elements of a document. Another technique for forming descriptors includes steps of forming bounding boxes around connected components and measuring interbox spacings. A histogram of interbox spacings is found and a threshold value is determined, with spacings less than the threshold deemed to be intercharacter spacing and spacings larger than the threshold deemed to be interword spacings. This latter technique permits descriptors to be formed for text without the need for optical character recognition, greatly increasing speed.

In the foregoing specification, the invention has been described with reference to specific exemplary embodiments thereof. It will, however, be evident that various modifications and changes may be made thereunto without departing from the broader spirit and scope of the invention as set forth in the appended claims.

Furthermore, the flowcharts described herein are illustrative of merely the broad logical flow of steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java, "C", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. The specification and drawings are, accordingly, to be regarded in an illustrative rather than a restrictive sense, the invention being limited only by the provided claims and their full scope of equivalents.

What is claimed is:

1. A computer-implemented method of operating an archival system for documents, each document separable into a plurality of segments, each segment being a document subset selected from the group consisting of picture, paragraph, imbedded graphic, sentence and phrase, said method comprising the steps of:

capturing an image of an unindexed document into the document archive system;

separating said image of said unindexed document into said plurality of segments;

forming descriptors of at least one of said plurality of segments of said unindexed document image;

searching an index of descriptors for documents in a document database using said formed descriptors of said segment of said unindexed document image;

identifying at least one document as a previous version of said unindexed document, said at least one document having more descriptors in common with said segment of said unindexed document than an unrelated document; and identifying said unindexed document as a later version of said at least one document in an index of said document database.

2. The method of claim 1 further comprising the step of:

updating a hypertext document comprising a first link to said at least one document by adding a second link to said later version of said at least one document.

3. The method of claim 2 wherein said first link and second link comprise titles of said at least one document and said later version of said at least one document.

4. The method of claim 2 wherein said updating step comprises:

extracting said title of said later version from a first page of said version.

5. The method of claim 1 wherein said capturing step comprises scanning in using a facsimile machine.

6. The method of claim 1 wherein said capturing step comprises scanning in using a copying machine.

7. The method of claim 1 wherein said capturing step comprises intercepting printer output data.

8. A computer-implemented method of browsing a document image database comprising the steps of:

capturing a search key document image;

forming descriptors of at least a segment of said search key document image;

searching an index of descriptors of said document image database using said formed descriptors of said segment of said search key document image;

identifying at least one document in said database as a matching document when the at least one document has more descriptors in common with said segment of said search key document image than a non-matching document; and displaying a hypertext link to said matching document along with hypertext links to one or more other versions of said matching document.

9. An automatic document archiving system comprising:

an image capture device that captures document images;

an electronic storage system storing:

a database of document images;

an index of descriptors of said document images;

at least one hypertext document comprising links to said document images, wherein hypertext links to document images representing different versions of a document are ordered in accordance with version;

an archive control system coupled to said image capture device and said electronic storage system and configured to:

form descriptors of at least a segment of said unindexed document image;

search said index of descriptors for documents in a document database using said formed descriptors of said segment of said unindexed document image;

identify at least one document as a previous version of said unindexed document that has more descriptors in common with said segment of the unindexed document than an unrelated document;

store said unindexed document in said database;

store said formed descriptors in said index; and add a link to said unindexed document adjacent to a link to said at least one document in said at least one hypertext document.

10. The system of claim 9 wherein said image capture device comprises a copier.

11. The system of claim 9 wherein said image capture device comprises a facsimile machine.

12. The system of claim 9 wherein said image capture device comprises a scanner.

13. A document querying system comprising:

an image capture device that captures document images;

an electronic storage system storing:

a database of document images;

an index of descriptors of said document images;

at least one hypertext document comprising links to said document images, wherein hypertext links to document images representing different versions of a document are ordered in accordance with version;

a querying control system coupled to said image capture device and said electronic storage system and configured to:

form descriptors of at least a segment of a target document captured by said image capture device;

search said index using said formed descriptors of said segment of said target document;

identify at least one document in said database as a matching document when the at least one document has more descriptors in common with said segment of said target document than a non-matching document; and display a hypertext link to said matching document along with hypertext links to one more other versions of said matching document.

14. A method of operating a digital copier comprising the steps of;

scanning in an image of at least a segment of a document to be copied, said segment being a document subset selected from the group consisting of picture, paragraph, imbedded graphic, sentence and phrase;

forming descriptors of said scanned-in segment of said document;

searching an index of descriptors of a document image database using said formed descriptors; and if a document of said document image database is identified as having more than a threshold count of said formed descriptors indicating a match, issuing an alert signal.

15. The method of claim 14 wherein said different descriptors contribute with different weights to said threshold count.

16. A digital copier having access to a document image database, said copier comprising:

a scanner for capturing an image of at least a segment of a document to be copied;

a processor configured to:

scan in an image of at least a segment of a document to be copied;

form descriptors of said scanned-in segment of said document;

search an index of descriptors of a document image database using said formed descriptors; and if a document of said document image database is identified as having more than a threshold count of said formed descriptors indicating a match, issue an alert signal.

17. A computer-implemented method of comparing a current version of a document to a previous version of said document comprising the steps of:

forming descriptors of at least a segment of said current version, said segment being a document subset selected from the group consisting of picture, paragraph, imbedded graphic, sentence and phrase;

searching an index of descriptors of a document image database using said formed descriptors of said scanned-in segment;

identifying at least one document as said previous version that has more descriptors in common with said segment than an unrelated document; and performing a difference computation between said previous version and said current version.

18. A computer-implemented method of comparing a current version of a document and a previous version wherein text has been moved non-locally within said document between said previous and current versions, said method comprising the steps of:

dividing said current version into segments;

dividing said previous version into segments;

forming sets of descriptors for a plurality of said segments of said current version and said previous version; and identifying segments that have moved non-locally within said document between previous and current versions by comparing said formed descriptors of said segments.

19. The method of claim 18 further comprising the step of:

displaying thumbnail images of said current version and said previous version highlighting said segments that have moved non-locally.

20. The method of claim 18 wherein said segments are paragraphs.

* * * * *